United States Patent [19]
Hashimoto et al.

[11] Patent Number: 5,287,837
[45] Date of Patent: Feb. 22, 1994

[54] KNOCK SUPPRESSING APPARATUS FOR INTERNAL COMBUSTION ENGINE

[75] Inventors: Atsuko Hashimoto; Toshio Iwata, both of Himeji, Japan

[73] Assignee: Mitsubishi Denki Kabushiki Kaisha, Tokyo, Japan

[21] Appl. No.: 748,725

[22] Filed: Aug. 22, 1991

[30] Foreign Application Priority Data

Aug. 24, 1990 [JP] Japan .................................. 2-221151
Aug. 24, 1990 [JP] Japan .................................. 2-221152

[51] Int. Cl.$^5$ .............................................. F02P 5/14
[52] U.S. Cl. .................................................. 123/425
[58] Field of Search ............... 123/425, 417, 422, 435; 364/431.08, 431.07

[56] References Cited

U.S. PATENT DOCUMENTS

| | | | |
|---|---|---|---|
| 4,711,212 | 12/1987 | Haraguchi et al. | 123/425 |
| 4,766,545 | 8/1988 | Nagai | 364/431.08 |
| 5,109,820 | 5/1992 | Iwata et al. | 123/425 |
| 5,121,729 | 6/1992 | Hashimoto et al. | 123/425 |
| 5,131,368 | 7/1992 | Komurasak | 123/425 |
| 5,140,962 | 8/1992 | Iwata | 123/425 |
| 5,156,126 | 10/1992 | Ohkabo et al. | 123/425 |
| 5,158,057 | 10/1992 | Ikaura et al. | 364/431.08 |
| 5,186,145 | 2/1993 | Sakakibara | 364/431.08 |
| 5,190,011 | 3/1993 | Hashimodo et al. | 123/425 |

FOREIGN PATENT DOCUMENTS

| | | | |
|---|---|---|---|
| 121790 | 3/1984 | European Pat. Off. | 123/425 |
| 293573 | 12/1988 | European Pat. Off. | 123/425 |

Primary Examiner—Raymond A. Nelli
Attorney, Agent, or Firm—Sughrue, Mion, Zinn, Macpeak and Seas

[57] ABSTRACT

A knock suppressing apparatus for an internal combustion engine includes: a knock sensor for sensing the vibrations of an engine and generating a corresponding output signal; an interface circuit for generating a vibration level based on the output signal of the knock sensor; a noise level detector for generating a noise level based on the vibration level; a memory for storing a basic noise level, a basic threshold level and a correction value in relation to the number of revolutions per minute of the engine; a calculator for updating the correction value based on the noise level, the basic noise level and a current engine operating condition, and generating a corrected threshold for knock determination based on the basic threshold and the updated correction value; a knock determiner for making a comparison between the vibration level and the corrected threshold and generating a knock determination signal if the vibration level exceeds the corrected threshold; and a controller for controlling, based on the knock determination signal from the knock determiner, an engine control parameter in a direction to suppress knocking. A condition determiner may be further provided for determining whether the engine is in a predetermined operating range suitable for updating the correction value. In this case, the calculator updates the correction value and generates the corrected threshold if the engine is in the predetermined operating range.

3 Claims, 7 Drawing Sheets

KNOCK SUPPRESSING APPARATUS FOR INTERNAL COMBUSTION ENGINE

BACKGROUND OF THE INVENTION

The present invention relates generally to an apparatus for suppressing a knocking phenomenon in an internal combustion engine (hereinafter also referred to as an engine for short) such as a gasoline engine for a motor vehicle.

In general, the internal combustion engine such as a gasoline engine for a motor vehicle includes a plurality of cylinders in each of which a fuel gas mixture is compressed and undergoes combustion at an optimal timing. In this conjunction, there has already been proposed and used widely in practical applications a microcomputer-based engine control unit (also known as ECU in abbreviation) for the purpose of optimally controlling the ignition timing as well as the sequence of fuel injections in association with the individual engine cylinders.

In connection with such engine operation control, it is known that when the ignition timing (usually given in terms of angular crank position or crank angle) is controlled to advance excessively, abnormal fuel combustion may take place, resulting in generation of vibrations or shock referred to as knocking of such a magnitude which may eventually damage or injure the engine cylinders. In order to avoid such an unwanted event, it is necessary to perform ignition timing control in such a manner that upon detection of abnormal vibrations or knocking, the ignition timing is shifted in a direction to afford an appropriate retard to the time point or timing at which fuel combustion takes place within the knocking cylinder.

For a better understanding of the background of the present invention, a known knock suppressing apparatus will be described in some detail by reference to FIG. 8 which is a block diagram showing the general arrangement of a known knock suppressing apparatus.

Figure 8:
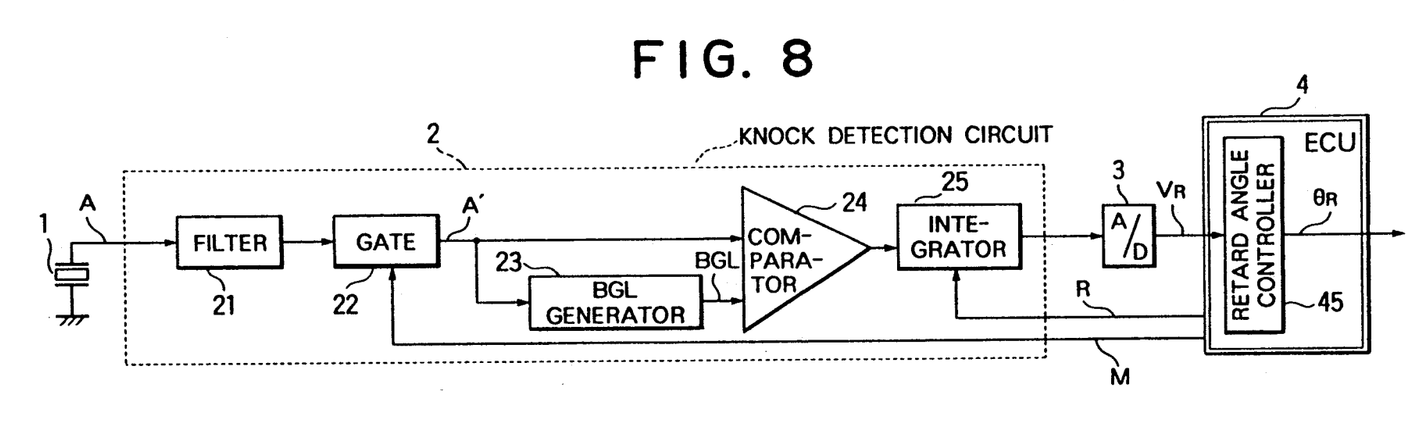
FIG. 8 is a block diagram showing the general arrangement of a known knock control apparatus for an internal combustion engine.

In FIG. 8, a reference numeral 1 denotes a knock sensor installed in association with each or a set of the cylinders of an internal combustion engine. The knock sensor 1 may be composed of a piezoelectric element or the like which is capable of detecting the vibrations or knocking of the associated cylinder in the form of an electric signal.

An output signal A of the knock sensor 1 is supplied to a knock detection circuit denoted generally by a reference numeral 2. The knock detection circuit 2 comprises a filter 21 having such a filtering characteristic as to pass therethrough only the frequency components which are peculiar to the knocking phenomenon (e.g., 7 kHz), a gate 22 for allowing the output signal of the filter 21 to pass therethrough periodically at a predetermined timing, a background level (BGL) generator 23 for generating a background level signal BGL on the basis of a signal derived by averaging an output signal A' of the gate 22, a comparator 24 for comparing the output signal A' of the gate 22 with the background level signal BGL for thereby producing an output signal of "ON" level when the gate output level A' exceeds the background level BGL, and an integrator 25 for integrating the output signal of the comparator 24. The output signal of the integrator 25 is then supplied to an analogue to digital (A/D) converter 3 to be converted to a digital signal $V_R$.

The digital signal $V_R$ is supplied to an engine control unit (ECU in abbreviation) 4 which may be constituted by a microcomputer which is programmed to perform ignition timing control for each of the engine cylinders on the basis of the output signal $V_R$ of the A/D converter 3 while supplying a masking pulse signal M to the gate 22 and a reset signal R to the integrator 25, respectively, for the purposes which will be described hereinafter. Further, the engine control unit or controller 4 includes a retard angle controller 45 for arithmetically determining an angle of retard for which the ignition timing is to be delayed for suppressing the knocking, thereby producing a retard control angle signal $O_R$ for controlling the amount of retard to be applied to the ignition timing on the basis of the digital signal $V_R$ outputted from the A/D converter 3.

Next, referring to a waveform diagram shown in FIG. 9, description will be made of operations performed by the known knock suppressing apparatus shown in FIG. 5.

Normally, in each of the cylinders of the internal combustion engine, ignition takes place at a timing corresponding to a crank angle or position which advances approximately by 5° relative to top dead center (TDC given by the crank angle of 0°) so that explosive combustion of the fuel gas mixture may occur at a crank angle of about 10° to 60° after passing top dead center (TDC). The knocking due to abnormal combustion will thus occur at the timing falling within the crank angle range of 10° to 60° in succession to top dead center.

Figure 9:
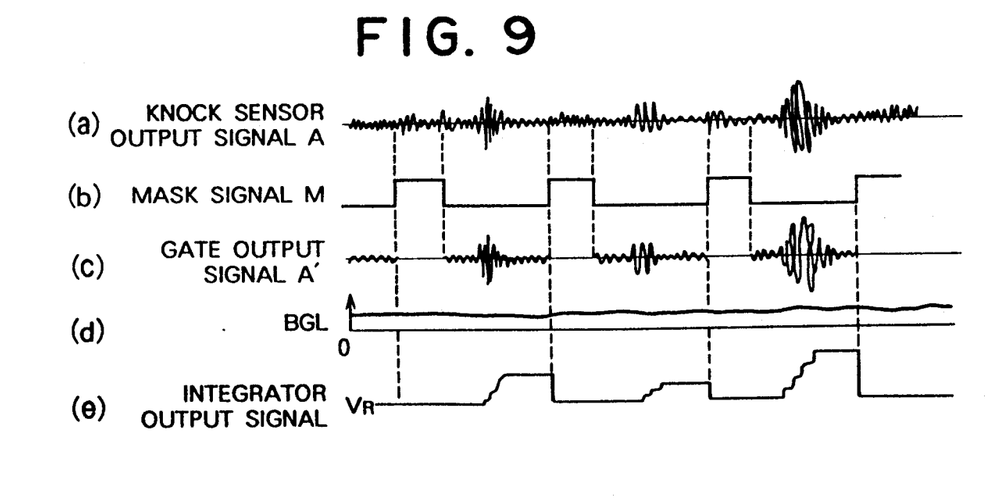
FIG. 9 is a waveform diagram illustrating the operation of the known knock control apparatus of FIG. 8.

Accordingly, upon every occurrence of vibration noise of the cylinders and inter alia knocking, the output signal A of the knock sensor 1 produced at corresponding periodical intervals assumes a significantly increased amplitude, as can be seen in the waveform shown in FIG. 9 at (a).

In the meanwhile, the engine control unit (ECU) 4 outputs to the gate 22 a masking pulse signal M which is inverted periodically at predetermined intervals in order to ensure that the knock detection circuit 2 can efficiently receive and process the sensor output signal A. More specifically, the masking pulse signal M is generated in such a waveform in which the leading edge thereof takes place at a time point corresponding to a crank angle of about 75° advancing relative to the top dead center of the associated cylinder (this advanced angle will hereinafter be represented by affixing "B" to the angle value, e.g. by "B75°") while the trailing edge of the masking pulse M occurs around a time point of B5° (i.e. at a time point corresponding to a crank angle of 5° before TDC), as can be seen in the waveform shown at (b) in FIG. 9. During the period in which the masking pulse assumes the level of "H", the gate 22 is blocked or disabled. Further, as mentioned previously, a reset signal R is outputted to the integrator 25 from the engine control unit 4 periodically at a predetermined timing which coincides with that of the leading edge of the masking pulse signal M.

The filter 21 constituting a part of the knock detection circuit 2 has such a filtering characteristic that the frequency components of the sensor output signal A produced upon occurrence of knocking can pass therethrough, while the gate 22 allows the sensor output signal A to pass therethrough only during a period in which the masking pulse signal M is at the level of "L", as shown at (c) in FIG. 9. The output of the gate 22 is denoted by a reference symbol A'. On the other hand, the background level (BGL) generator 23 generates a background level BGL contained in the gate output signal A' by discriminatively separating the former from the latter, as is illustrated at (d) in FIG. 9, wherein the background level BGL serves as a reference for detection of a knocking event or phenomenon.

When the gate output signal A' exceeds the background level BGL, the comparator 24 determines that knocking has taken place and produces a comparison output of "H" level. The integrator 25 starts to integrate the output signal of the comparator 24 every time it is reset by the reset signal R supplied from the engine control unit 4, as is illustrated at (e) in FIG. 9. The output signal of the integrator 25 is then converted form analog into digital form by the A/D converter 3, the resulting digital integration value $V_R$ being then inputted to the engine control unit (ECU) 4.

In this manner, the engine control unit 4 fetches therein the A/D converted integration value $V_R$ upon every occurrence of ignitions in the cylinder, to thereby generate a retarded control angle signal $\theta_R$ for controlling the ignition timing of a knocking cylinder in a sense to suppress the knocking. To this end, the retard angle calculator 45 constituting a part of the engine control unit 4 adds an angle of retardation $d\theta_R$ to a current normal ignition control angle $\theta_R^*$, at which ignition is to take place when there is no knocking, to provide a current retarded control angle signal $\theta_R$. Accordingly, the current retarded control angle $\theta_R$ can be given by the following equation:

$$\theta_R = \theta_R^* + d\theta_R \qquad (1)$$

In equation (1) above, the angle of retardation $d\theta_R$ is given by the following equation:

$$d\theta_R = V_R \times L$$

where L represents a weighing coefficient.

As will be understood from the foregoing, with the known knock suppressing apparatus as described above, the background level BGL, which is directly calculated based on an average of the output signal from the gate 22 in a predetermined period, is utilized as a threshold for knock determination. As a result, the threshold calculated in this manner always has a characteristic related to the average of the gate output, so it is difficult to arbitrarily obtain a desired knock determining threshold as necessary irrespective of the averaged gate output.

SUMMARY OF THE INVENTION

Accordingly, the present invention is intended to overcome the above-described problem of the known knock suppressing apparatus.

An object of the present invention is to provide a knock suppressing apparatus for an internal combustion engine in which a previously determined knock determination threshold is corrected or updated to an appropriate value on the basis of a deviation between a current knock sensor output and the last knock sensor output for reliable knock determination with improved accuracy irrespective of variations in manufacture of the engine.

Another object of the invention is to provide a knock suppressing apparatus for an internal combustion engine in which the knock determination threshold can be corrected for further improved knock determination according to whether the engine is in a certain operating range.

According to one aspect of the invention, there is provided a knock suppressing apparatus for an internal combustion engine comprising:

a knock sensor for sensing the vibrations of an engine and generating a corresponding output signal;

an interface circuit for generating a vibration level based on the output signal of the knock sensor.

a noise level detector for generating a noise level based on the vibration level;

memory means for storing a basic noise level, a basic threshold level and a correction value in relation to the number of revolutions per minute of the engine;

calculating means for updating the correction value based on the noise level, the basic noise level and a current engine operating condition, and generating a corrected threshold for knock determination based on the basic threshold and the updated correction value;

a knock determiner for making a comparison between the vibration level and the corrected threshold and generating a knock determination signal if the vibration level exceeds the corrected threshold; and a controller for controlling, based on the knock determination signal from the knock determiner, an engine control parameter in a direction to suppress knocking.

According to another aspect of the invention, there is provided a knock suppressing apparatus for an internal combustion engine comprising:

a knock sensor for sensing the vibrations of an engine and generating a corresponding output signal;

an interface circuit for generating a vibration level based on the output signal of the knock sensor.

a noise level detector for generating a noise level based on the vibration level;

memory means for storing a basic noise level, a basic threshold level and a correction value in relation to the number of revolutions per minute of the engine;

a condition determiner for determining whether the engine is in a predetermined operating range suitable for updating the correction value;

calculating means for updating the correction value based on the noise level, the basic noise level and a current engine operating condition, and generating a corrected threshold for knock determination based on the basic threshold and the updated correction value if the engine is in the predetermined operating range;

a knock determiner for making a comparison between the vibration level and the corrected threshold and generating a knock determination signal if the vibration level exceeds the corrected threshold; and a controller for controlling, based on the knock determination signal from the knock determiner, an engine control parameter in a direction to suppress knocking.

Other objects, advantages and novel features of the present invention will become more apparent from the following detailed description of a few preferred embodiments thereof taken in conjunction with the accompanying drawings.

DESCRIPTION OF THE PREFERRED EMBODIMENTS

The present invention will now be described in detail in conjunction with preferred embodiments thereof by reference to the accompanying drawings.

Figure 1:
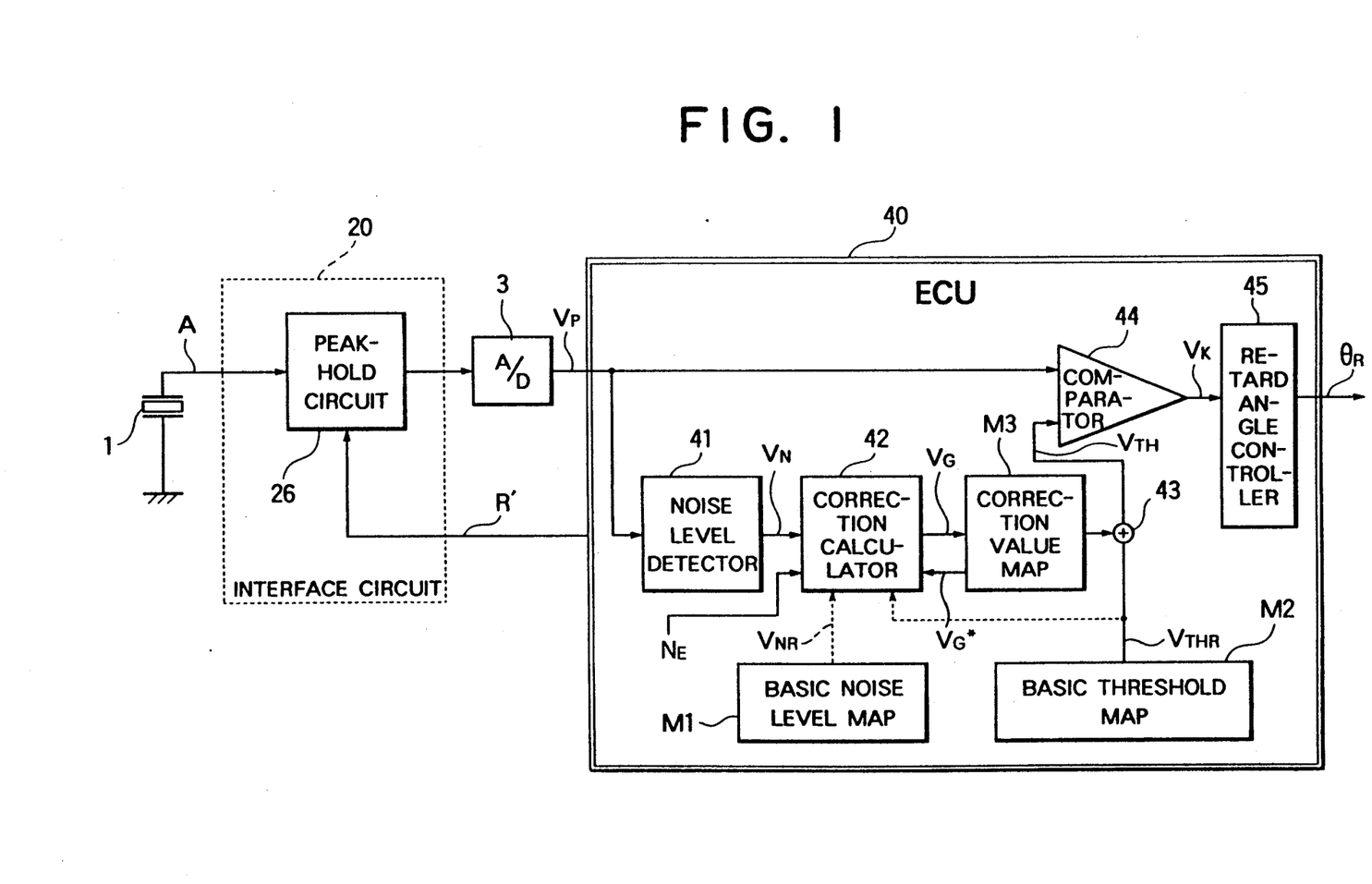
FIG. 1 is a block diagram showing the general arrangement of a knock control apparatus for an internal combustion engine according to an embodiment of the present invention.

FIG. 1 shows in a block diagram the general arrangement of a knock suppressing apparatus for an internal combustion engine according to an embodiment of the invention. In this figure, reference numerals 1, 3 and 45 denote a knock sensor, an analog-to-digital (A/D) converter and a controller in the form of a retard angle controller, respectively, which serve for same or similar functions as the corresponding ones of the known knock suppressing apparatus described hereinbefore by reference to FIGS. 8 and 9. Accordingly, repeated description of these parts will be unnecessary.

Figure 2:
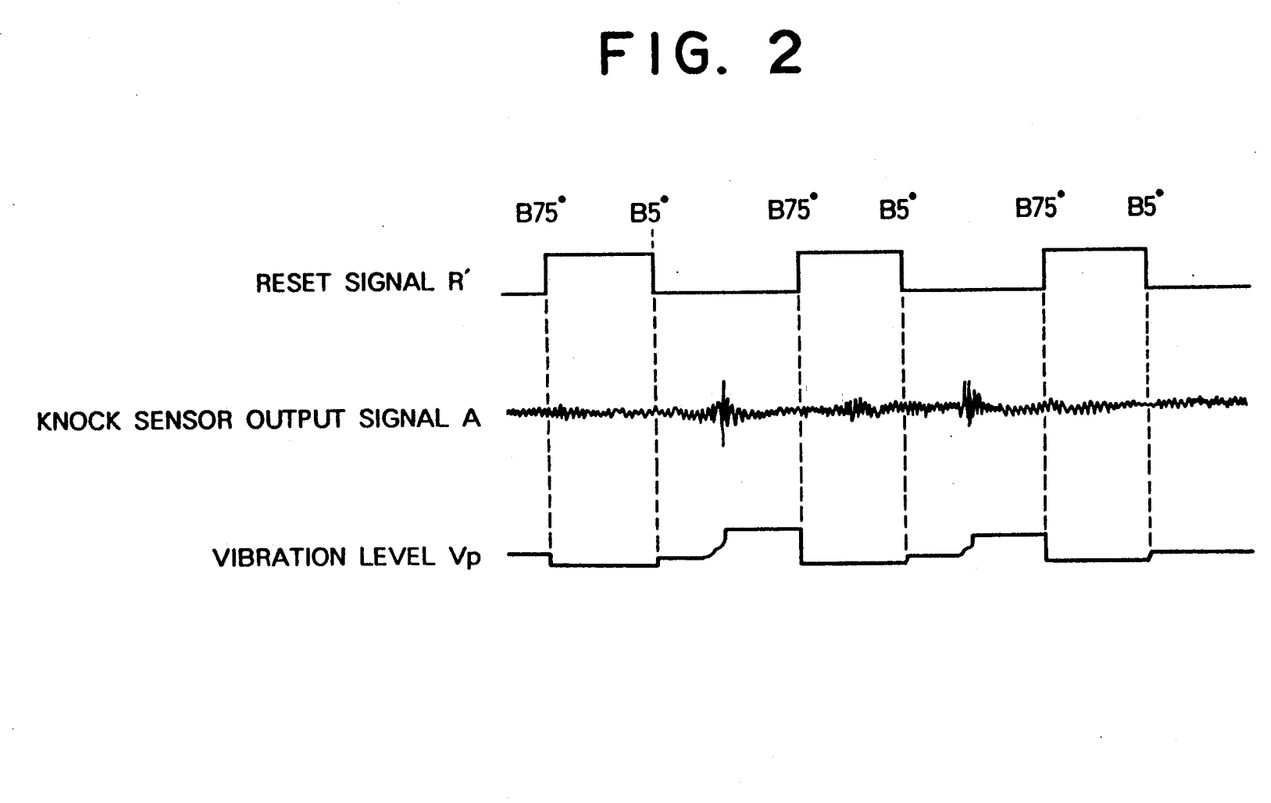
FIG. 2 is a waveform diagram for illustrating the operation of the knock control apparatus shown in FIG. 1.

Referring to FIG. 1, there is interposed between the knock sensor 1 and the A/D converter 3 an interface circuit 20 which may be constituted by a peak hold circuit 26. In this connection, it should be noted that a reset signal R' for resetting the peak hold circuit 26 is generated by the engine control unit (ECU) 40 in synchronism with the rotation of an internal combustion engine of concern. Referring to FIG. 2, which is a waveform diagram for illustrating the operation of the knock suppressing apparatus of FIG. 1, the reset signal R' includes a series of pulses each rising up at a first reference crank angle of B75° (i.e. at 75° before top dead center (BTDC) of an associated cylinder) and falling at a second reference crank angle of B5° (i.e. at 5° BTDC). The peak hold circuit 26 operates to generate a peak level at the first reference crank position of B75° for the associated cylinder, wherein the peak level is inputted to the engine control unit (ECU) 40 as a vibration level $V_P$ by way of the A/D converter 3.

The engine control unit (ECU) 40 includes a noise level detector 41 for generating a noise level $V_N$ based on the level of vibrations $V_P$ of each cylinder, a basic noise level map M1 in the form of a memory storing a basic noise level $V_{NR}$ for each of a plurality of ranges of the number of revolutions per minute (rpm) of the engine $N_E$, a basic threshold map M2 in the form of a memory storing a basic threshold $V_{THR}$ for each of the 60 rpm ranges, a correction calculator 42 for generating a correction value $V_G$ for a threshold $V_{TH}$ based on the rpm of the engine $N_E$, a noise level $V_N$, a basic noise level $V_{NR}$, and a basic threshold $V_{THR}$, a correction value map M3 in the form of a memory successively storing an updated correction value $V_G$ for each of the rpm ranges corresponding to the engine rpm $N_E$, an adder 43 for adding a correction value $V_G$ selected from the correction value map M3 to the basic threshold $V_{THR}$ to provide a knock determination threshold $V_{TH}$, a comparator 44 for making a comparison between the vibration level $V_P$ and the knock determination threshold $V_{TH}$ and generating a knock signal Vk if the vibration level $V_P$ exceeds or becomes greater than the knock determination threshold $V_{TH}$, and a retard angle processor 45 for generating, based on the knock signal Vk, a retarded control angle $\theta_R$ for controlling to properly retard the ignition timing of a knocking cylinder. In this regard, the correction calculator 42, the correction value map M3 and the adder 43 together constitute a calculating means for generating a threshold $V_{TH}$ based on a noise level $V_N$, a basic noise level $V_{NR}$, and a basic threshold $V_{THR}$. In addition, the correction value map M3 acting as a storage means is supplied with power from a battery (not shown) for holding the correction values $V_G$ therein. Also, the rpm of the engine $N_E$ is generated based on the period of an output signal from an unillustrated crank angle sensor, which senses a reference crank angle such as 75° before top dead center (BTDC), 5° BTDC, etc., by the ECU 40 which executes an rpm detection program.

The operation of the above-described knock suppressing apparatus as illustrated FIG. 1 will be described in detail with particular reference to the waveform diagram of FIG. 2, the noise level characteristic diagram of FIG. 3, the threshold characteristic diagram of FIG. 4 and the flow chart of FIG. 5.

First, an exemplary engine is test run so as to detect the level of engine vibrations $V_P$ in relation to the varying rpm thereof. Based on the vibration level $V_P$ thus detected, a basic noise level $V_{NR}$ and a basic threshold $V_{THR}$ are calculated for the engine rpm and then stored in the basic noise level map M1 and the basic threshold map M2, respectively, in relation to the engine rpm.

Specifically, the vibration level $V_P$ at the time when no noise due to knocking is discerned is set as a noise level, whereas the vibration level $V_P$ when noise due to knocking is discerned is set as a knocking level.

For the noise level, the maximum value among a prescribed number (preferably, corresponding to the number of the cylinders) of consecutive vibration levels $V_P$ is taken, and a plurality of the maximum values thus taken in a prescribed period are then averaged to finally provide a basic noise level $V_{NR}$. Accordingly, the basic noise level $V_{NR}$ is expressed as follows:

$$V_{NR} = \{V_P(1) + V_P(2) + \ldots + V_P(K)\}/K \qquad (2)$$

where $V_P(i)$ is the maximum value of the i-th group of successive vibration levels $V_P$ during a predetermined number (i.e., n) of consecutive ignitions, and K is the number of collection of the maximum values $V_P(i)$.

For example, in case of a four-cylinder engine, n is 4 and K is 10 or so. The basic noise level $V_{NR}$ is also calculated for the engine rpm $N_E$ in a similar manner, and it is set as shown by a dashed line in FIG. 3.

Figure 4:
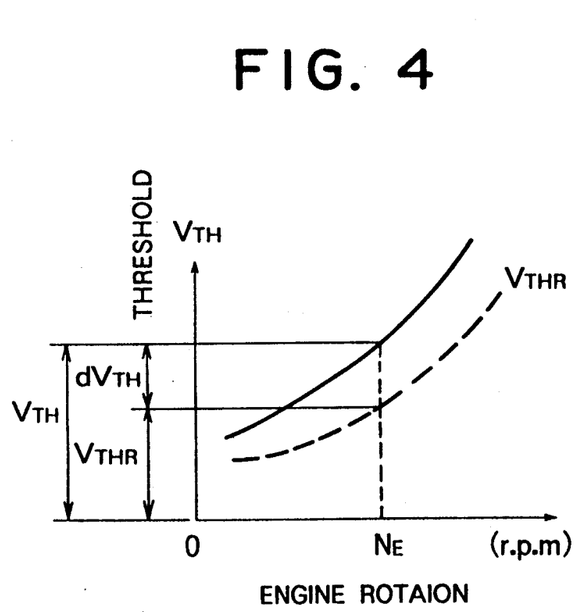
FIG. 4 is a characteristic view showing the relationship between the threshold $V_{TH}$ and the engine r.p.m.

Similarly, the basic threshold $V_{THR}$ used for making discrimination between the noise level and the knock level is set to a value between the basic noise level $V_{NR}$ and the basic knock level for the rpm $N_E$, as shown in FIG. 4.

In this manner, using an exemplary engine, characteristic curves for the basic noise level $V_{NR}$ and the basic threshold $V_{THR}$ in relation to the engine rpm are obtained. In this connection, however, the engine operating characteristics actually differ from one engine to another, so the basic noise level curve $V_{NR}$ and the basic threshold curve $V_{THR}$ are corrected or modified in the manner as shown by the solid lines in FIGS. 3 and 4, respectively.

Next, the operation of the engine and the process of calculating the correction value $V_G$ successively performed by the ECU 40 are described below in detail.

Upon engine starting, the correction value map M3 is in a reset state and there is no correction value data stored therein. As a result, the adder 43 outputs a basic threshold $V_{THR}$ from the basic threshold map M2 as a threshold $V_{TH}$.

The knock sensor 1 senses the vibrations of engine cylinders in the same manner as described before with reference to the known knock suppressing apparatus of FIG. 8 and generates a corresponding output signal A for detecting knocking therein. The ECU 40 takes in or fetches the analog-to-digital converted peak level of the output signal A from the knock sensor 1 upon every ignition of each cylinder.

Specifically, in Step S1, the peak-hold circuit 26 operates to hold the peak level of the output signal A from the knock sensor 1, which is then A/D converted into a digital vibration level $V_P$ by the A/D converter 3 and input to the ECU 40.

In Step S2, when the vibration level $V_P$ is sampled at a reference crank angle of 75° BTDC, the ECU 40 generates a reset signal R', as shown in FIG. 2, by which the peak-hold circuit 26 is reset at about the reference crank angle of 75° BTDC (i.e., in actuality slightly later than 75° BTDC).

The peak-hold circuit 26 continues to be reset as long as the reset signal R' remains on, and it begins to operate when the reset signal R' falls (e.g., at a crank angle of 5° BTDC). Accordingly, the ECU 40 repeatedly carries out an interrupt routine, as shown in FIG. 5, each time the vibration level $V_P$ is generated at the reference crank angle of 75° BTDC due to ignitions of the cylinders.

As shown in FIG. 2, the vibration level $V_P$ developed at every reference crank angle of 75° BTDC of each cylinder varies from one sampling cycle to another in accordance with a change in the knock sensor output A. Such a variation includes both a knock component and a noise component, so it is desirable that the variation does not contribute to the generation of a threshold $V_{TH}$. In this connection, considering a time-dependent change in the vibration level $V_P$, however, it is necessary for the threshold $V_{TH}$ to follow or reflect the vibration level $V_P$ to some extent for the purpose of ensuring accurate knock detection.

To this end, in Step S3, the noise level detector 41 of the ECU 40 averages the maximum values of the vibration level $V_P$ sampled at predetermined intervals using formula (2) above, to provide a noise level $V_N$ at the current engine rotational number (rpm) $N_E$.

Figure 5:
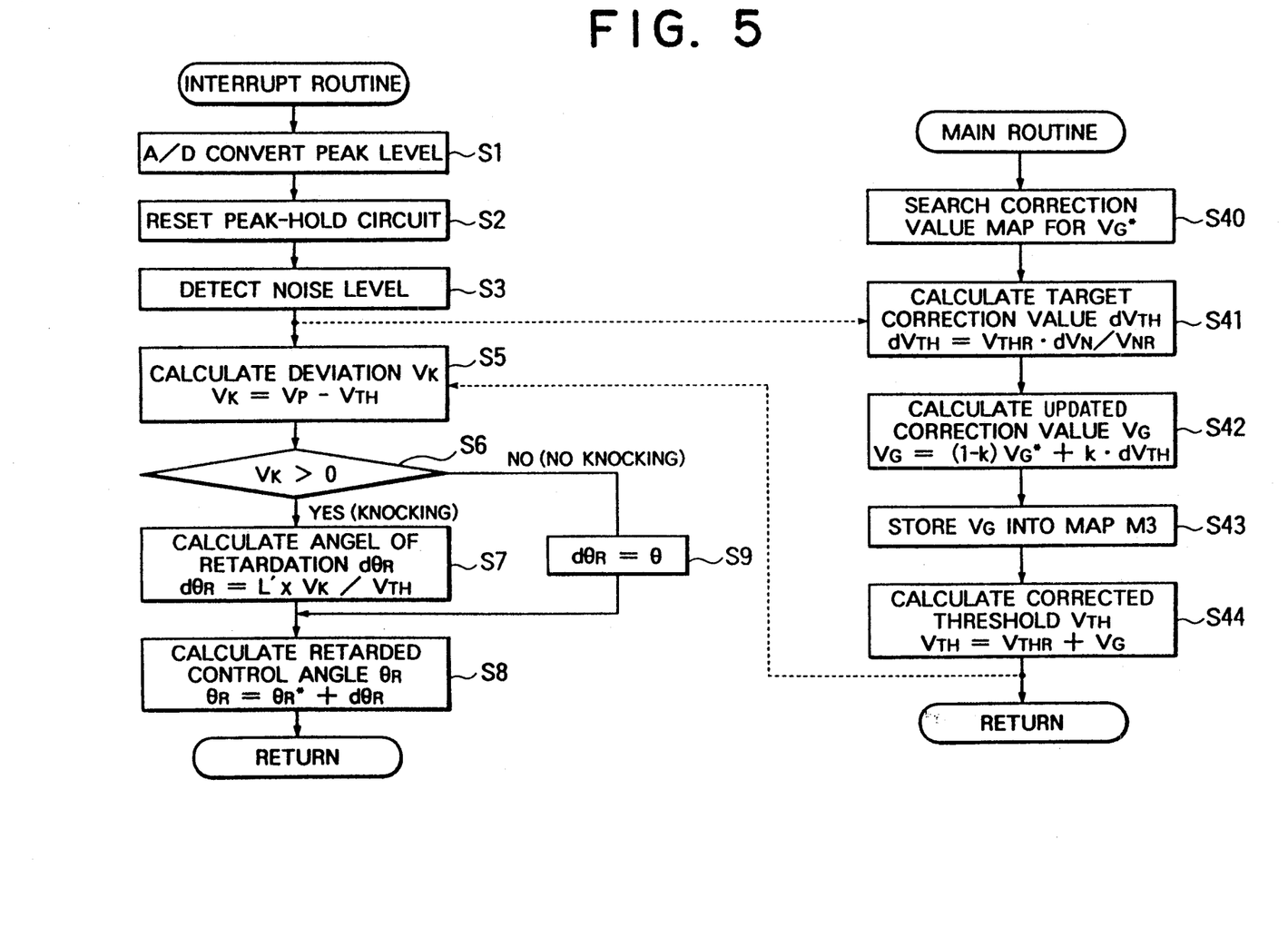
FIG. 5 is a flow chart illustrating a knock control method of the present invention carried out by the apparatus of FIG. 1.

On the other hand, in Step S40 in the processing of the main routine of FIG. 5, the correction calculator 42 searches the correction value map M3 for a most recent or last correction value $V_G^*$ stored therein at the current rpm $N_E$.

The correction calculator 42 calculates a correction value for the basic threshold $V_{THR}$ on the basis of the last correction value $V_G^*$ for the threshold $V_{TH}$ searched from the correction value map M3 at the current rpm $N_E$, the noise level $V_N$ from the noise level detector 41, the basic noise level $V_{NR}$ and the basic threshold $V_{THR}$ selected from the respective maps M1, M2.

Figure 3:
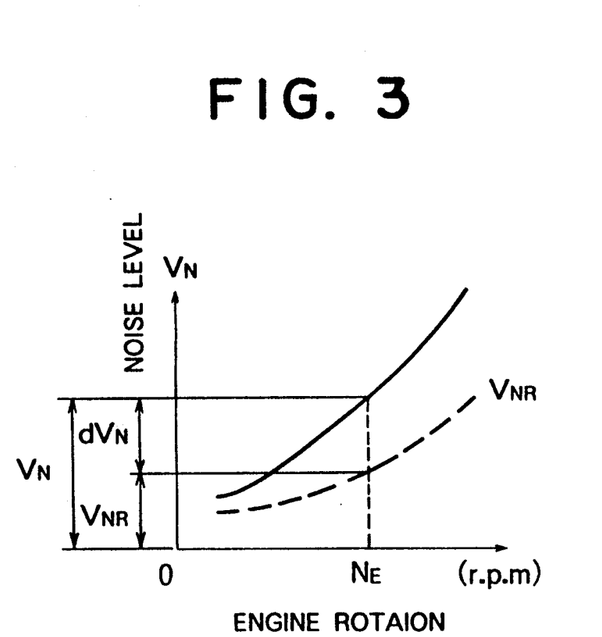
FIG. 3 is a characteristic view showing the relationship between the noise level $V_N$ and the engine r.p.m.

More specifically, in Step S41, the correction value calculator 42 calculates the correction value in the form of a deviation $dV_N$ between the noise level $V_N$ and the basic noise level $V_{NR}$ both at the rpm $N_E$, as shown in FIG. 3. In this regard, the ratio of the deviation $dV_N$ to the basic noise level $V_{NR}$ coincides with the ratio of a target correction value $dV_{TH}$ to the basic threshold $V_{THR}$, as shown in FIG. 4, so the following equation is established:

$$dV_N/V_{NR} = dV_{TH}/V_{THR}$$

From this equation, the target correction value $dV_{TH}$ is obtained as follows:

$$dV_{TH} = V_{THR} \times dV_N/V_{NR} \quad (3)$$

Subsequently, in Step S42, an updated correction value Vc, which follows or reflects the target correction value $dV_{TH}$ to some extent, is calculated using the following equation:

$$Vc = (1-k)Vc^* + k \times dV_{TH} \quad (4)$$

where k is a constant representing a contribution or weighing coefficient for the target correction value $dV_{TH}$, the constant k being less than 1 and greater than zero (0 < k < 1). The constant k can be set to an arbitrary value as necessary. In accordance with the smoothing step S42 using equation (4) above, there is obtained the correction value $V_G$ which follows or reflects the noise level $V_N$ to some extent and which is stable to a sufficient extent.

In Step S43, the correction calculator 42 stores in the specific memory area of the correction value map M3 corresponding to the current rpm $N_E$ an updated or new correction value $V_G$ every time it is calculated using equation (4) above while reflecting the target correction value $dV_{TH}$. In this manner, the contents of the correction value map M3 are successively rewritten or updated.

In Step S44, the adder 43 adds the correction value $V_G$ obtained from the correction value map M3 at that time to the basic threshold $V_{THR}$ at the rpm $N_E$ to provide a corrected threshold $V_{TH}$ as follows:

$$V_{TH} = V_{RTHR} + V_c \quad (5)$$

At this time, the updated correction value $V_G$ somewhat follows or reflects the noise level $V_N$, so the threshold $V_{TH}$ obtained using equation (5) above is substantially free from variations, which would otherwise take place from one sampling cycle to another, and hence it is a highly reliable value.

Then, the interrupt routine of FIG. 5 is carried out at the reference crank angle of 75° BTDC, and in Step S5, the knock determiner 44 in the form of a comparator calculates a deviation Vk between the vibration level $V_P$ and the threshold $V_{TH}$ for comparison therebetween as follows:

$$Vk = V_P - V_{TH}$$

In Step S6, it is determined whether the deviation Vk is positive (Vk > 0). If $V_P > V_{TH}$, that is Vk > 0, the comparator 44 generates a knock determination signal Vk indicative of the occurrence of knocking.

In Step S7, upon receipt of the knock determination signal Vk, the retard angle controller 45 calculates an angle of retardation $d\theta_R$ required for suppressing the knocking in the following manner:

$$d\theta_R = (Vk/V_{TH}) \times L' \quad (6)$$

where $L'$ is a reflecting or weighing coefficient.

From equation (6) above, the angle of retardation $d\theta_R$ is calculated on the basis of the ratio of the knock determination signal Vk to the threshold $V_{TH}$, so that an appropriate angle of retardation $d\theta_R$ can always be provided even if the vibration level $V_P$ itself varies over time.

After this, on the basis of the angle of retardation $d\theta_R$ thus obtained, the retard angle controller 45 calculates a retarded control angle $\theta_R$ for retarding the ignition timing of a knocking cylinder in a direction to suppress the knocking, using the following formula:

$$\theta_R = \theta_R^* + d\theta_R$$

where $\theta_R^*$ is a current normal ignition control angle at which ignition is to take place when there is no knocking.

On the other hand, if in Step S6 it is determined that the deviation Vk is equal to or less than zero (i.e., Vk≦0), there is no knock determination signal Vk generated. In this case, the program goes to Step S9 wherein from equation (6), the angle of retardation $d\theta_R$ becomes equal to zero ($d\theta_R = 0$). As a result, the retarded control angle $\theta_R$ remains unchanged or is the same as before.

In this manner, on the basis of the retarded control angle $\theta_R$ as obtained in this manner, the ignition timing for a knocking cylinder is properly controlled in a retarding direction, thus suppressing the knocking.

Accordingly, in the normal operating condition of the engine, a highly reliable threshold $V_{TH}$ can be set on the basis of the updated correction value $V_G$ without being influenced by a sudden great change in the vibration level $V_P$, so knock determination can be performed with a high degree of accuracy.

Although in the above embodiment, the interface circuit 20 for generating the vibration level $V_P$ comprises the peak-hold circuit 26, it may be composed of an integrator while providing substantially the same results.

In addition, although in the above embodiment, the comparator 44 outputs a knock determination signal Vk in the form of a deviation or difference between the vibration level $V_P$ and the threshold $V_{TH}$, it can simply generate an output signal of a high level when the vibration level $V_P$ exceeds the threshold $V_{TH}$.

Figure 6:
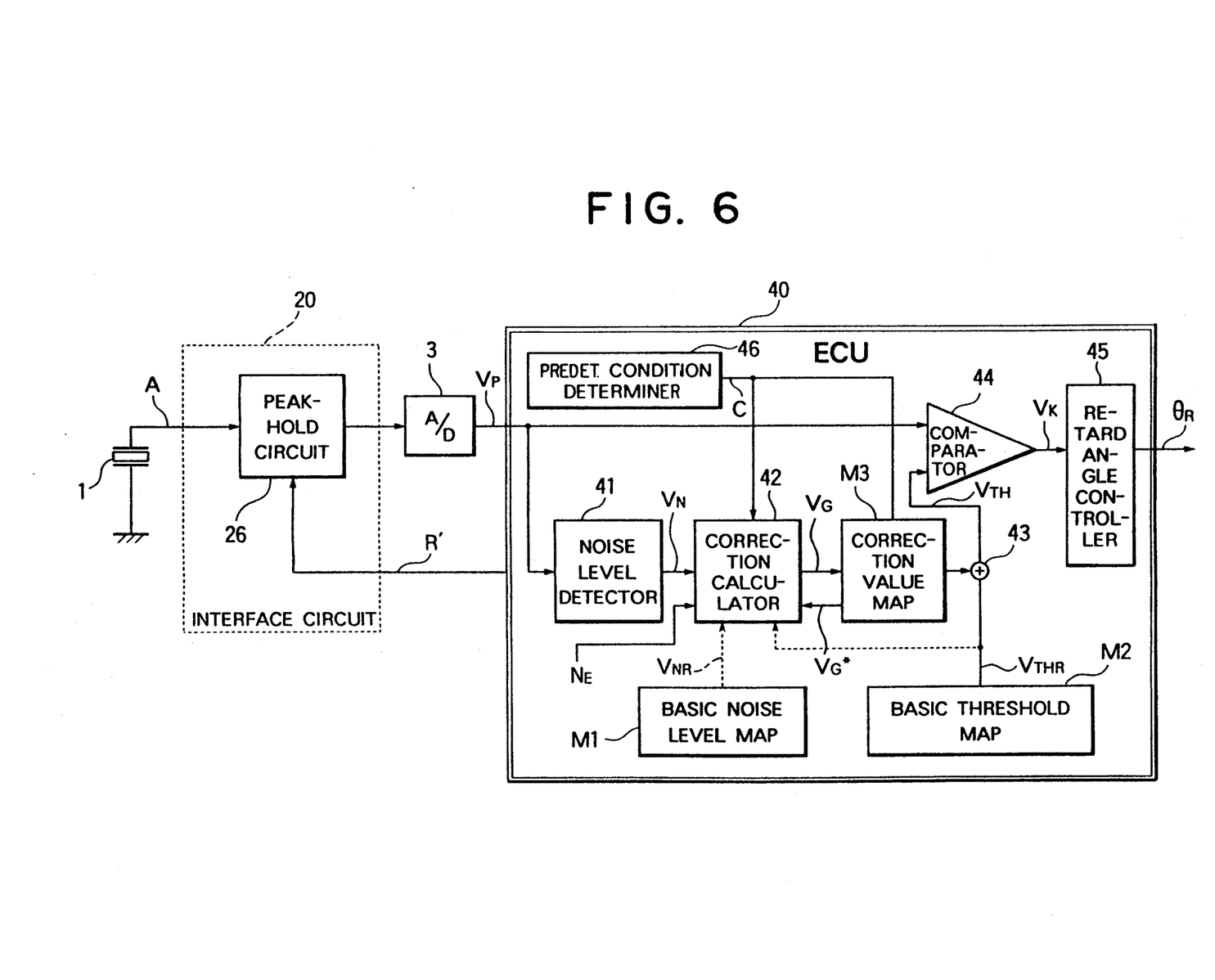
FIG. 6 is a view similar to FIG. 1, but showing a knock control apparatus in accordance with another embodiment of the invention.

FIG. 6 shows another embodiment of the invention which is substantially similar in operation and construction to the previous embodiment of FIG. 1 except for the fact that the ECU 40 further includes a condition determining means 46 for determining whether the engine is in a predetermined operation range suitable for updating the angle of retardation or correction. More specifically, the condition determining means 46 generates an enable signal C to the correction calculator 42 and the correction value map M3 only when the engine is in a prescribed operating condition such as a medium load condition, a steady-state operating condition, or the like. Preferably, the condition determining means 46 determines, based on the engine rpm $N_E$ or the rate of change thereof, or the throttle opening indicative of an engine load, whether the engine is in the steady-state operating condition or the medium load condition.

The operation of this embodiment is substantially similar to that of the previous FIG. 1 embodiment as illustrated in the flow chart of FIG. 5 except for the following. As shown in the flow chart of FIG. 7 which illustrates the operation of the FIG. 6 embodiment, after Step S40 of searching the correction value map M3 for a correction value $V_G^*$, the program proceeds to Step S40 wherein the condition determining means 46 of the ECU 40 determines, based on the engine rpm $N_E$ or the rate of change thereof, or the throttle opening representative of the engine load condition, whether the engine is in a predetermined operating range. Such a determination is required for the following reasons. Namely, it is generally necessary to make the current correction value $V_G$ for the threshold $V_{TH}$ follow or track the noise level $V_N$, but when the engine is in a transient operating condition such as when it is rapidly accelerated or decelerated, or when the engine is under a heavy load or light load, there will be a great change in the noise level $V_N$. Accordingly, in these particular operating conditions of the engine, it is undesirable to reflect the noise level $V_N$ on the current correction value $V_C$. As a result, it is required that the noise level $V_N$ be reflected on the current correction value $V_G$ only when the engine is in a predetermined condition or range such as a steady-state operating condition, in which there is little change in the rpm of the engine, a medium load condition, and the like.

Figure 7:
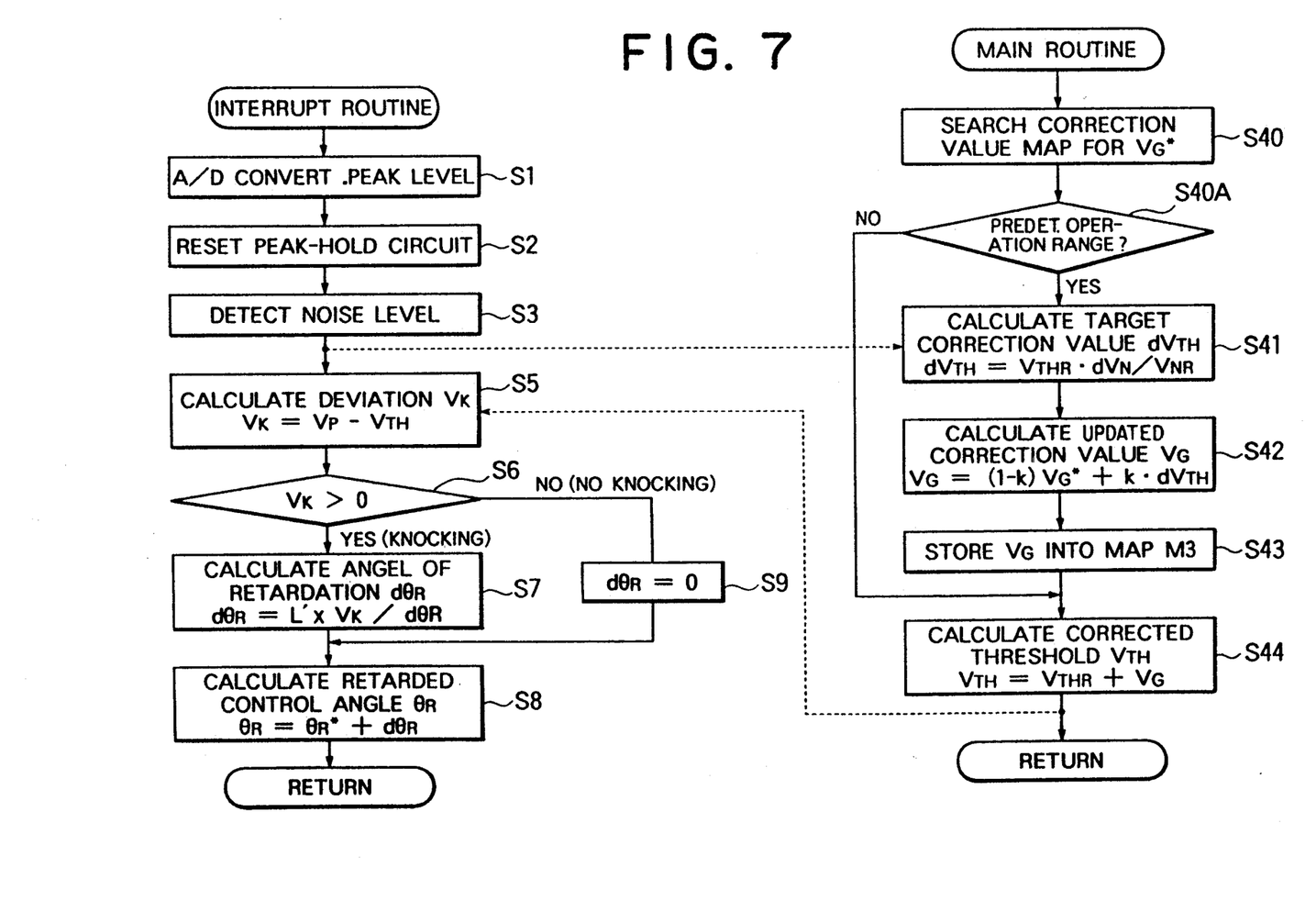
FIG. 7 is a flow chart illustrating a knock control method of the invention carried out by the apparatus of FIG. 6.

Thus, if in Step S40A of FIG. 7 it is determined that the engine is in the predetermined operating range, the condition determining means 46 generates an enable signal C to the correction calculator 42 and the correction value map M3 whereby the calculator 42 calculates a current correction value $V_G$ for the basic threshold $V_{THR}$ in the same manner as in the previous embodiment. In other words, in this case, the program proceeds from Step S40A to Step S41, and thereafter the same process sets S41 through S44 are performed.

On the other hand, if in Step S40A it is determined that the engine is out of the predetermined operating range, then the condition determining means 46 generates no enable signal C so that the correction calculator 42 remains inoperative and the correction value map M3 does not output the last or preceding correction value $V_G^*$ to the correction calculator 42. As a result, Steps S41 through S43 are skipped and the program jumps from Step S40A to Step S44 while the correction value $V_G^*$ in the correction value map M3 is not updated.

Consequently, only a relatively stable vibration level $V_P$ is reflected as a valid noise level (i.e., a background level) $V_P$, whereas a vibration level $V_P$, which varies greatly, is not reflected on the correction value $V_G$ and hence on the threshold $V_{TH}$.

Although in the second-mentioned embodiment, the condition determining means 46 generates an enable signal C when the engine is in the predetermined operating range, it may instead generate an enable signal C when the vibration level $V_P$ is less than the knock level. In this modification, the knock determining steps S5 and S6 as well as the retard angle control steps S7 through S9 are performed immediately after the vibration level collection step S1, and the threshold $V_{TH}$ at this time is given on the basis of the last or preceding correction value $V_G^*$ selected from the correction value map M3 in the search step S40 and the basic threshold $V_{THR}$.

Accordingly, if in Step S6 it is determined that knocking takes place, the noise level generating step S3 and the correction value calculating and updating steps S41 through S43 are not performed and hence the contents of the correction value map M3 are not updated either. On the contrary, if in Step S6 it is determined that there is no knocking, the noise generating step S3 and the correction value calculating and updating steps S41 through S43 are carried out so that the contents of the correction value map M3 are updated to reflect the noise level $V_N$. As a result, only when the vibration level $V_P$ is at the background level, the current correction value $V_G$ is updated and reflected on the threshold $V_{TH}$. Thus, in this modification, substantially the same results are provided as those obtained by the second-mentioned embodiment.

What is claimed is:

1. A knock suppressing apparatus for an internal combustion engine comprising:
    a knock sensor for sensing the vibrations of an engine and generating a corresponding output signal;
    an interface circuit for generating a vibration level based on the output signal of said knock sensor.
    a noise level detector for generating a noise level based on the vibration level;
    memory means for storing a basic noise level, a basic threshold level and a correction value in relation to the number of revolutions per minute of the engine;
    calculating means for updating the correction value based on the noise level, the basic noise level and a current engine operating condition, and generating a corrected threshold for knock determination based on the basic threshold and the updated correction value;
    a knock determiner for making a comparison between the vibration level and the corrected threshold and generating a knock determination signal if the vibration level exceeds the corrected threshold; and
    a controller for controlling, based on the knock determination signal from said knock determiner, an engine control parameter in a direction to suppress knocking.

2. A knock suppressing apparatus according to claim 1, where said calculating means calculates the corrected knock determination threshold $V_{TH}$ based on a previous threshold $V_{THR}$ and the correction value $V_G$ using the following formula:

$$V_{TH} = V_{THR} + V_G$$

where $V_G$ is calculated based on a previous correction value $V_G^*$ and a target correction value $dV_{TH}$ as follows:

$$V_G = (1-k)V_G^* + k \times dV_{TH}$$

wherein k is a constant which is less than 1 and greater than 0, and the target correction value $dV_{TH}$ is calculated based on the previous threshold $V_{THR}$, a deviation $dV_N$ between the vibration level and the previous threshold, and the corrected threshold $V_{TH}$ as follows:

$$dV_{TH} = V_{THR} \times dV_N / V_{TH}$$

3. A knock suppressing apparatus for an internal combustion engine comprising:
    a knock sensor for sensing the vibrations of an engine and generating a corresponding output signal;
    an interface circuit for generating a vibration level based on the output signal of said knock sensor.
    a noise level detector for generating a noise level based on the vibration level;
    memory means for storing a basic noise level, a basic threshold level and a correction value in relation to the number of revolutions per minute of the engine;
    a condition determiner for determining whether the engine is in a predetermined operating range suitable for updating the correction value;
    calculating means for updating the correction value based on the noise level, the basic noise level and a current engine operating condition, and generating a corrected threshold for knock determination based on the basic threshold and the updated correction value if the engine is in the predetermined operating range;
    a knock determiner for making a comparison between the vibration level and the corrected threshold and generating a knock determination signal if the vibration level exceeds the corrected threshold; and
    a controller for controlling, based on the knock determination signal from said knock determiner, an engine control parameter in a direction to suppress knocking.

* * * * *